United States Patent
Bogin et al.

(10) Patent No.: US 9,424,211 B2
(45) Date of Patent: *Aug. 23, 2016

(54) PROVIDING MULTIPLE VIRTUAL DEVICE CONTROLLERS BY REDIRECTING AN INTERRUPT FROM A PHYSICAL DEVICE CONTROLLER

(75) Inventors: Zohar Bogin, Folsom, CA (US); Suryaprasad Kareenahaili, Folsom, CA (US); Rajeev K. Nalawadi, El Dorado Hills, CA (US); Michael Tabet, Folsom, CA (US); Darren Abramson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1145 days.

This patent is subject to a terminal disclaimer.

(21) Appl. No.: 12/347,970

(22) Filed: Dec. 31, 2008

(65) Prior Publication Data
US 2010/0169883 A1   Jul. 1, 2010

(51) Int. Cl.
 *G06F 9/455* (2006.01)
 *G06F 13/24* (2006.01)
 *G06F 9/48* (2006.01)

(52) U.S. Cl.
 CPC ............ *G06F 13/24* (2013.01); *G06F 9/45533* (2013.01); *G06F 9/45558* (2013.01); *G06F 9/4812* (2013.01)

(58) Field of Classification Search
 None
 See application file for complete search history.

(56) References Cited

U.S. PATENT DOCUMENTS

| | | | |
|---|---|---|---|
| 7,111,145 B1 * | 9/2006 | Chen et al. | 711/206 |
| 7,418,584 B1 | 8/2008 | Klaiber et al. | |
| 7,447,794 B1 * | 11/2008 | Miller et al. | 709/232 |
| 7,689,747 B2 * | 3/2010 | Vega et al. | 710/261 |
| 7,707,341 B1 * | 4/2010 | Klaiber et al. | 710/244 |
| 7,802,073 B1 * | 9/2010 | Cheng et al. | 712/10 |
| 2005/0228923 A1 * | 10/2005 | Zimmer et al. | 710/269 |
| 2006/0036791 A1 * | 2/2006 | Jeyasingh et al. | 710/260 |
| 2006/0047877 A1 * | 3/2006 | Winkler et al. | 710/260 |
| 2007/0067534 A1 * | 3/2007 | Butler et al. | 710/260 |
| 2007/0157197 A1 * | 7/2007 | Neiger et al. | 718/1 |
| 2008/0162762 A1 * | 7/2008 | Neiger et al. | 710/261 |
| 2008/0294825 A1 | 11/2008 | Mahalingam et al. | |

(Continued)

FOREIGN PATENT DOCUMENTS

| | | |
|---|---|---|
| CN | 101128807 A | 2/2008 |
| EP | 1804164 A1 | 7/2007 |

(Continued)

OTHER PUBLICATIONS

Office Action received for German Patent Application No. 102009060301.8, mailed on Aug. 30, 2010, 3 pages of German Office Action including 1 page of English Translation.

(Continued)

*Primary Examiner* — Jacob A Petranek
(74) *Attorney, Agent, or Firm* — Thomas R. Lane

(57) ABSTRACT

Embodiments of apparatuses, methods, and systems for providing multiple virtual device controllers by redirecting an interrupt from a physical device controller are disclosed. In one embodiment, an apparatus includes a processor, a physical device controller, and virtualization logic. The virtualization logic is to receive a first interrupt from the physical device controller, and in response, send a second interrupt to the processor from one of a plurality of virtual device controllers.

6 Claims, 3 Drawing Sheets

(56) References Cited

U.S. PATENT DOCUMENTS

| | | | |
|---|---|---|---|
| 2009/0031304 A1* | 1/2009 | Song | 718/1 |
| 2009/0248947 A1* | 10/2009 | Malwankar et al. | 710/316 |
| 2009/0328035 A1* | 12/2009 | Ganguly | 718/1 |
| 2010/0049892 A1 | 2/2010 | Schwarz et al. | |
| 2010/0223611 A1* | 9/2010 | Mahalingam et al. | 718/1 |

FOREIGN PATENT DOCUMENTS

| | | |
|---|---|---|
| EP | 2157511 A1 | 2/2010 |
| JP | 2007-183951 A | 7/2007 |
| TW | I253251 B | 4/2006 |
| WO | 02/052404 A2 | 7/2002 |

OTHER PUBLICATIONS

"Intel 64 and IA-32 Architectures Software Developer's Manual", System Programming Guide, vol. 3B, Part 2, Order No. 253669-026US, Feb. 2008, pp. 27-3 to 27-11.

Office Action received for Great Britain Patent Application No. 0922460.1, mailed on Apr. 5, 2011, 1 page.

Office Action received for Japanese Patent Application No. 2009-293549, mailed on Apr. 12, 2011, 3 pages of Japanese Office Action including 1 page of English Translation.

Office Action received for United Kingdom Patent Application No. GB0922460.1, mailed on Apr. 9, 2010, 11 pages.

Office Action received for Chinese Patent Application No. 200910217299.5, mailed on Aug. 2, 2013, 5 pages of Chinese Office Action and 6 pages of English Translation.

Office Action received for Taiwanese Patent Application No. 098144755, mailed on Aug. 30, 2013, 4 pages of Taiwanese Office Action and 1 page of Search report.

Office Action received for Chinese Patent Application No. 200910217299.5, mailed on Jul. 31, 2012, 11 pages of Chinese Office Action including 6 page of English Translation.

Office Action received for Chinese Patent Application No. 200910217299.5, mailed on Feb. 21, 2013, 12 pages of Chinese Office Action including 8 page of English Translation.

Examination Report received for United Kingdom Patent Application No. GB0922460.1, mailed on Oct. 12, 2011, 2 pages of Examination Report.

* cited by examiner

FIGURE 3
ENTRY 300

| 310 physical MSI address | 320 physical MSI data | 330 virtual MSI address | 340 virtual MSI data |

PROVIDING MULTIPLE VIRTUAL DEVICE CONTROLLERS BY REDIRECTING AN INTERRUPT FROM A PHYSICAL DEVICE CONTROLLER

BACKGROUND

1. Field

The present disclosure pertains to the field of information processing, and more particularly, to the field of virtualization in an information processing system.

2. Description of Related Art

Generally, the concept of virtualization in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM., that runs outside of the virtualization environment.

A physical processor in an information processing system may support virtualization, for example, by supporting an instruction to enter a virtualization environment to run a guest on a virtual processor (i.e., a physical processor under constraints imposed by a VMM) in a VM. In the virtualization environment, certain events, operations, and situations, such as external interrupts or attempts to access privileged registers or resources, may be intercepted, i.e., cause the processor to exit the virtualization environment so that a VMM may operate, for example, to implement virtualization policies. For example, external interrupts may be intercepted by the VMM and routed to the appropriate virtual processor.

A physical resource in the system, such as an input/output device controller, may be assigned or allocated to a VM on a dedicated basis. Alternatively, a physical resource may be shared by multiple VMs, by intercepting all transactions involving the resource so that the VMM may perform, redirect, or restrict each transaction. A third approach may be to design the physical resource to provide the capability for it to be used as multiple virtual resources.

BRIEF DESCRIPTION OF THE FIGURES

The present invention is illustrated by way of example and not limitation in the accompanying figures.

FIG. 3 illustrates an entry to store information for redirecting an interrupt according to an embodiment of the present invention.

DETAILED DESCRIPTION

The present invention may be embodied in an apparatus or method for redirecting an interrupt, as described below. In the description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the description of the present invention.

It may be desirable for a single physical device controller to be shared by multiple virtual machines, without requiring that a VMM intercept all transactions involving the device controller or that the device controller be redesigned to support virtualization. Therefore, embodiments of the invention may be used to redirect an interrupt from a single physical device controller so as to make the physical device controller appear as multiple virtual device controllers.

Elements of embodiments of the invention may be implemented in hardware, software, firmware, or any combination of hardware, software, or firmware. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or an expression that is implemented or embodied in a hardware structure (e.g., flash memory or read only memory). Examples of firmware are microcode, writable control store, and micro-programmed structure.

Figure 1:
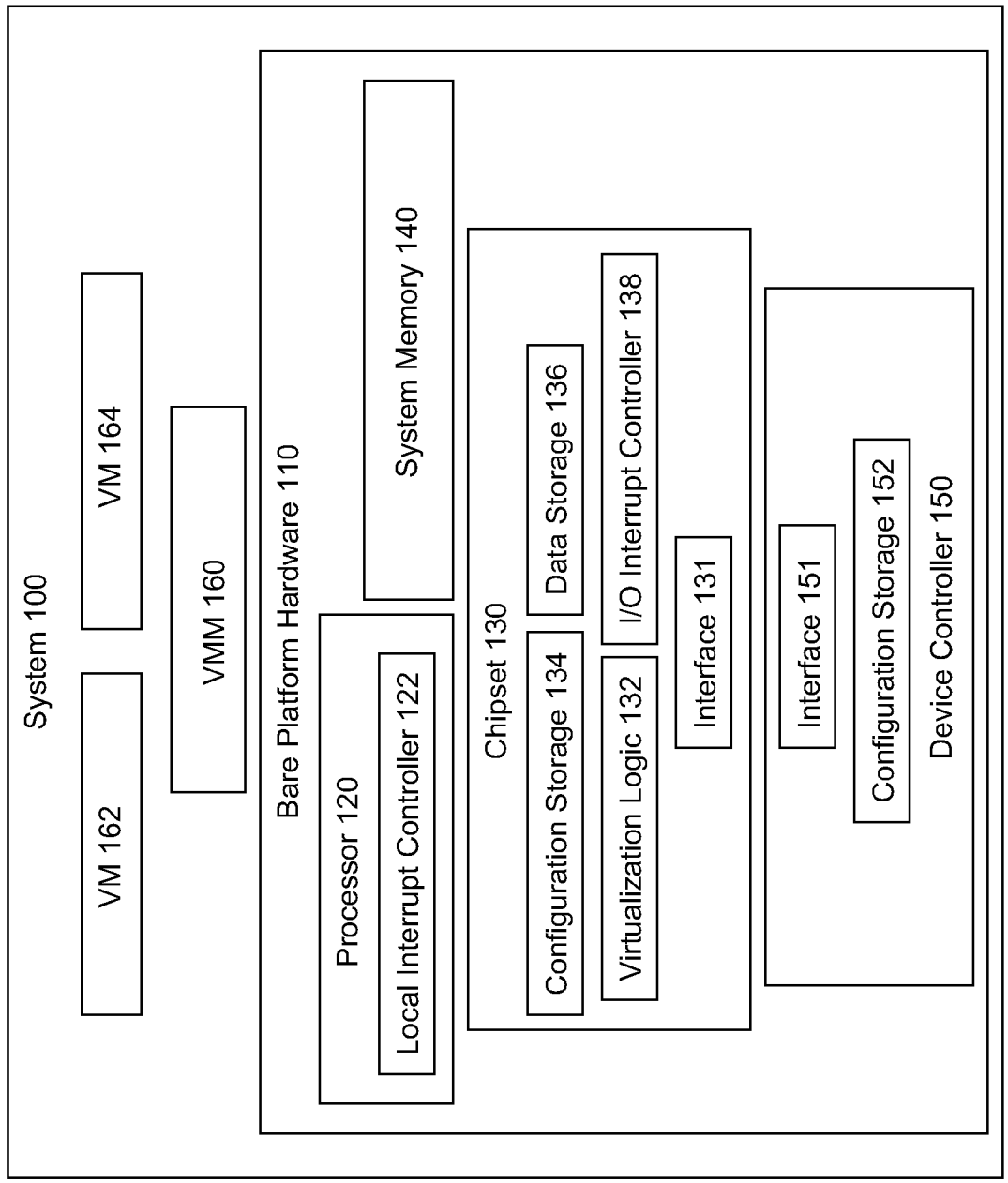
FIG. 1 illustrates an apparatus for redirecting an interrupt according to an embodiment of the present invention.

FIG. 1 illustrates information processing system 100, in which an interrupt may be redirected according to an embodiment of the present invention. Information processing system 100 includes bare platform hardware 110, which may be any apparatus capable of executing any OS, VMM, or other software. For example, bare platform hardware 110 may be the hardware of a personal computer, a mainframe computer, a portable computer, a handheld device, a set-top box, a server, or any other computing system. In this embodiment, bare platform hardware 110 includes processor 120, chipset 130, system memory 140, and device controller 150.

Processor 120 may be any component having one or more execution cores, where each execution core may be based on any of a variety of different types of processors, including a general purpose microprocessor, such as a processor in the Intel® Pentium® Processor Family, Itanium® Processor Family, or other processor family from Intel® Corporation, or another processor from another company, or a digital signal processor or microcontroller. Although FIG. 1 shows only one such processor 120, bare processing hardware 110 may include any number of processors, including any number of multicore processors, each with any number of execution cores, and any number of multithreaded processors, each with any number of threads.

Chipset 130 may be any group of circuits and logic that supports memory operations, input/output operations, configuration, control, internal or external interface, connection, or communications functions (e.g., "glue" logic and bus bridges), and/or any similar functions for processor 120 and/or system 100. Individual elements of chipset 130 may be grouped together on a single chip, a pair of chips, dispersed among multiple chips, and/or be integrated partially, totally, redundantly, or according to a distributed approach into one or more processors, including processor 120. In this embodiment, chipset 130 includes virtualization logic 132 for redirecting interrupts according to an embodiment of the invention, as described below. In other embodiments, virtualization logic 132 may be included elsewhere in system 100.

System memory 140 may include any medium on which information, such as data and/or instructions, may be stored, such as static or dynamic random access memory, semiconductor-based read-only or flash memory, magnetic or optical disk memory, or any other type of medium readable by processor 120, or any combination of such mediums.

Device controller 150 may represent a controller for any type of I/O, peripheral, or other device that may be the source of an interrupt request, such as a hard disk controller, an audio controller, a network interface controller, a peripheral bus controller, etc. Device controller 150 may be embodied in a discrete component, or may be included in an integrated component with any other device controllers. In one embodiment, device controller 150 may represent a function in a multifunctional I/O, peripheral, or other device controller. Device controller 150 may include configuration storage 152 to store configuration information.

Processor 120, chipset 130, system memory 140, and device controller 150 may be coupled to or communicate with each other according to any known approach, such as directly or indirectly through one or more parallel, sequential, pipelined, asynchronous, synchronous, wired, wireless, or other bus or point-to-point connection or means of communication. For example, in this embodiment, chipset 130 includes interface 131 to receive signals, messages, and/or transactions, such as interrupt requests, from device controller 150, or transmit signals, messages, and/or transactions to device controller 150 and/or any other agents or components in system 100, through any such connection or other means of communication. Similarly, device controller 150 includes interface 151 to transmit and/or receive signals, messages, and/or transactions to chipset 130, and/or any other agents or components in system 100. System 100 may also include any number of additional agents, components, or connections.

System 100 also includes VMM 160 and VMs 162 and 164. VMM 160 may be any software, firmware, or hardware host installed to run on or accessible to bare platform hardware 110, to present VMs, i.e., abstractions of bare platform hardware 110, to guests, or to otherwise create VMs, manage VMs, and implement virtualization policies within system 100. In other embodiments, a host may be any VMM, hypervisor, OS, or other software, firmware, or hardware capable of controlling bare platform hardware 110. A guest may be any OS, any VMM, including another instance of VMM 160, any hypervisor, or any application or other software.

Each guest expects to access resources, such as processor and platform registers, memory, and input/output devices, of either bare platform hardware 110 or a platform virtualized by VMM 160, according to the architecture of the processor and the platform presented in the VM. FIG. 1 shows two VMs, 162 and 164, on each of which may be installed a guest OS and any number of guest applications. Although FIG. 1 shows two VMs, any number of VMs may be created, and any number of guest OSes and guest applications may be installed to run on each VM within the scope of the present invention.

Returning to chipset 130, virtualization logic 132 may include any circuitry, logic, or other structure, such as firmware, to redirect an interrupt from a physical device controller, such as physical device controller 150. Chipset 130 also includes interface 131, described above, configuration storage 134, and data storage 136. Configuration storage 134 and data storage 136 may include any medium on which information may be stored; for example, configuration storage 134 may include programmable registers and data storage 136 may include static random access memory. Virtualization logic 132 may read and write information from and into configuration storage 134 and/or data storage 136 to determine and to maintain the status of which physical device controllers' interrupts to trap, to which VM each shared physical device controller is currently allocated, where to redirect trapped interrupts for each VM, etc. Configuration storage 134 and data storage 136 may be mapped into the address space of processor 110 so that they may be used to exchange information between virtualization logic 132 and VMs 162 and 164.

Chipset 130 may receive an interrupt request through interface 131 from device controller 150. In one embodiment, an interrupt request may be received as a signal, such as a level or edge triggered interrupt signal through an input terminal, according to any known signaling protocol (a "pin interrupt"). In another embodiment, an interrupt request may be received as a message, such as a bus message or a point-to-point transaction, according to any known message, transaction, or other communication protocol. For example, in an embodiment where device controller 150 is coupled to chipset 130 through a Peripheral Component Interconnect Express ("PCI-Express") bus, the bus protocol may include message signaled interrupts ("MSI"), in which an interrupt message may include a 32-bit address field and a 32-bit data field. Other embodiments are possible, including an embodiment using both signal and message based interrupt requests.

System 100 may include one or more interrupt controllers to prioritize and deliver interrupt requests to processor 120 and/or any other agents in system 100. In one embodiment, processor 120 includes local interrupt controller 122, and chipset 130 includes I/O interrupt controller 138.

The interrupt request may be directed to processor 120, to execute an interrupt handler associated with device controller 150. The intended interrupt handler may be indicated by information conveyed by the interrupt request, such as the contents of the address and/or data fields in an MSI, or by the identity of the input terminal, pin, or signal path for a pin interrupt. However, to support the virtualization of device controller 150, the interrupt request may be trapped by virtualization logic 132, i.e., an interrupt message or signal intended for processor 120 is intercepted and modified by virtualization logic 132.

Figure 2:
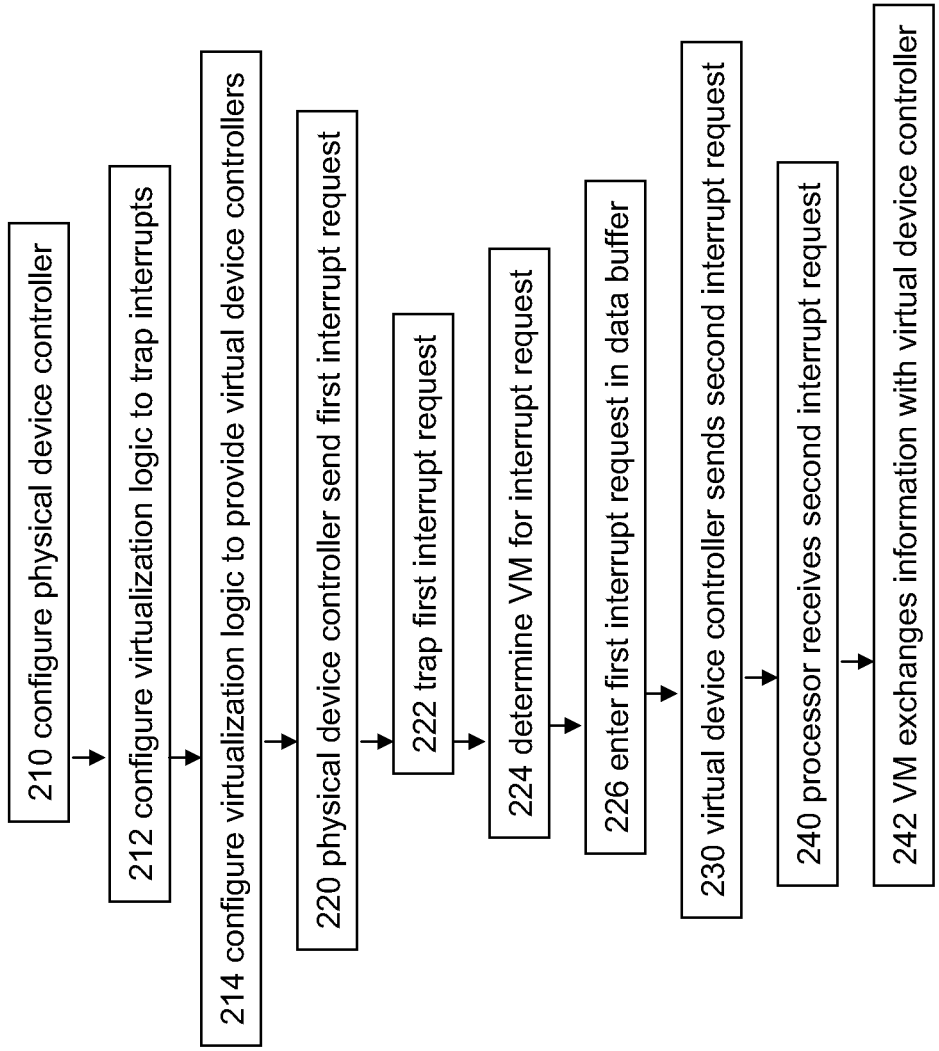
FIG. 2 illustrates a method for redirecting an interrupt according to an embodiment of the present invention.

FIG. 2 illustrates method 200, in which an interrupt may be redirected according to an embodiment of the present invention. In the description of the method embodiment of FIG. 2, reference may be made to elements of the system embodiment of FIG. 1; however, method embodiments of the invention are not limited in this respect.

In box 210 of method 200, an information processing system, e.g., system 100, is configured such that each physical device controller that may be the source of an interrupt request, e.g., device controller 150, is associated with an interrupt handler. Configuration information may be stored in configuration storage 152, which may be, for example, an MSI register.

In an embodiment including MSIs, physical device controller 150 may be configured, for example by virtualization logic 132, to use a first address value in the address field and a first data value in the data field of its MSIs. The first address value may be an address associated with local interrupt controller 122 according to the view of system memory maintained by VMM 160. The first data value may be an address associated with an interrupt handler for device controller 150 according to the view of system memory maintained by VMM 160.

In an embodiment including pin interrupts, physical device controller 150 may be configured by hard-wiring or softwiring its interrupt request output to be received by I/O interrupt controller 138, in such a manner that it may be intercepted by virtualization logic 132. For example, the interrupt request output may be multiplexed to either I/O interrupt controller 134 or virtualization logic 132. The I/O interrupt controller 138 may be programmed to associate the interrupt handler for device controller 150 with the input to which the interrupt request output from device controller 150 is connected.

In box 212, virtualization logic 132 is configured to trap interrupt requests from device controller 150.

In an embodiment including MSIs, virtualization logic 132 may include a number of locations in configuration storage 134 that may be programmed with address and data values for which MSI transactions on the bus between chipset 130 and device controller 150 are trapped. For example, FIG. 3 illustrates entry 300 in configuration storage 134, which includes physical MSI address field 310, physical MSI data field 320, virtual MSI address field 330, and virtual MSI data field 340. In this embodiment, the first address value and the first data value may be programmed into physical MSI address field 310 and physical MSI data field 320, respectively. Entry 300 may then be used, as further described below, to associate a virtual device controller with physical device controller 150. Additional entries, in the format of entry 300, may also be programmed with the first address and the first data value to associate additional virtual device controllers with physical device controller 150.

In an embodiment including pin interrupts, the interrupt request signal may be switched from being received by local interrupt controller 138 to being received by virtualization logic 132.

In box 214, virtualization logic 132 may be configured to associate one or more of the virtual device controllers representing physical device controller 150 with one or more VMs.

In an embodiment using MSIs, the locations in configuration storage 134 that may be programmed with address and data values for which MSI transactions are trapped may include additional corresponding locations that may be programmed with address and data values associated with a VM (e.g., virtual MSI address field 330 and virtual MSI data field 340). For example, VM 152 may not have access to all of system memory 140; therefore, VM 152's view of system memory 140 may be different from VMM 150's view. According to VM 152's view of system memory 140, the address associated with local interrupt controller 122 may not be the first address value described in connection with box 212, but rather may be a second address, and the address associated with the interrupt handler for device controller 150 may not be the first data value, but rather may be a second data value. Therefore, the virtual MSI address field 330 may be programmed with the second address value, and virtual MSI data field 340 may be programmed with the second data value.

In an embodiment using pin interrupts, virtualization logic 132 may be configured to send an interrupt request to I/O interrupt controller 138 on behalf of a virtual device controller that corresponds to physical device controller 150. Configuration storage 134 or data storage 136 may include locations for storing mappings of the interrupt request input from physical device controllers to interrupt request outputs to I/O interrupt controller 138.

In box 220, physical device controller 150 makes a first interrupt request, for example, by issuing an MSI transaction or by asserting an interrupt signal. In box 222, virtualization logic 132 traps the interrupt request. In box 224, virtualization logic 132 determines for which VM the first interrupt request is intended, for example, based on information stored in data storage 136 and/or polling physical device controller 150. In box 226, virtualization logic 132 enters the first interrupt request in a queue, buffer, or other location in data storage 136, so that it may be found by a VM for exchanging information with virtualization logic 132.

In box 230, virtualization logic 132 sends a second interrupt request, corresponding to but separate from the first interrupt request in box 220, to processor 120. In one embodiment, the second interrupt request may not be sent until control of processor 120 has been transferred to the VM for which the first interrupt request is intended. This second interrupt request may be in the form of a message or a signal. In an embodiment where it is a message, the address, data, and/or any other information contained in the message may be information corresponding to a virtual device controller rather than a physical device controller. For example, an MSI may be sent on the bus between processor 120 and chipset 130, with the second address value, from virtual MSI address field 330, in the address field and the second data value, from virtual MSI data field 340, in the data field. In an embodiment where the second interrupt request is a signal, a signal may be sent from virtualization logic 132 to I/O interrupt controller 138, and then a signal may be sent from I/O interrupt controller 138 to processor 120. The signal sent from virtualization logic 132 may be a signal that corresponds to a virtual device controller rather than physical device controller 150, based on the mappings discussed in the description of box 214. In either embodiment, VMM 160 may not be aware that the information corresponds to a virtual device controller rather than a physical device controller, because the virtualization has been performed by virtualization logic 132 rather than VMM 160.

In box 240, processor 120 receives the second interrupt request, acquires the vector to the interrupt handler, and begins executing the interrupt handler in the intended VM. In box 242, the VM may exchange information with virtualization logic 132 through data storage 136.

Within the scope of the present invention, method 200 may be performed with illustrated boxes omitted, with additional boxes added, or with a combination of reordered, omitted, or additional boxes. Some boxes, such as 226 and 230, may be performed in parallel.

Any component or portion of a component designed according to an embodiment of the present invention may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses, methods, and systems for redirecting an interrupt have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   a physical device controller;
   a processor to execute a plurality of virtual machines, each virtual machine having a virtual device controller associated with the physical device controller, and a virtual machine monitor;
   a local interrupt controller;
   a system memory;
   programmable configuration storage in which to store a plurality of entries, including a first entry including a physical address value, a physical data value, a virtual address value, and a virtual data value, the physical address value associated with the local interrupt controller according to the virtual machine monitor's view of the system memory, the physical data value corresponding to a first address of an interrupt handler according to the virtual machine monitor's view of the system memory, the virtual address value associated with the local interrupt controller according to one of the plurality of virtual machines' view of the system memory, and the virtual data value corresponding to a second address of the interrupt handler according to the one of the plurality of virtual machines' view of the system memory, wherein additional entries include the first physical address value and the first physical data value to associate additional virtual machine's virtual device controllers with the physical device controller;
   virtualization circuitry to trap a first interrupt message without the virtual machine monitor intercepting the first interrupt message, the first interrupt message having the physical address value in an address field of the first interrupt message and the physical data value in a data field of the first interrupt message, from the physical device controller to the processor, and in response, send a second interrupt message, including the virtual address value in an address field of the second interrupt message and the virtual data value in a data field of the second interrupt message, to the processor from one of a plurality of virtual device controllers associated with the physical device controller, the second interrupt message corresponding to but separate from the first interrupt message.

2. The apparatus of claim 1, wherein the programmable configuration storage is to be programmed to maintain status of which of the plurality of virtual machines the first interrupt message is to be redirected.

3. The apparatus of claim 1, wherein the virtualization circuitry is to send the second interrupt message to the processor only after control of the processor has been transferred to the virtual machine.

4. A method comprising:
   executing, by a processor, a plurality of virtual machines and a virtual machine monitor;
   trapping, by virtualization circuitry without interception by the virtual machine monitor, a first interrupt message from a physical device controller to the processor, the first interrupt message having a physical address value in an address field of the first interrupt message and a physical data value in a data field of the first interrupt message, the physical address value associated with a local interrupt controller according to the virtual machine monitor's view of a system memory, the physical data value corresponding to a first address of an interrupt handler according to a virtual machine monitor's view of a system memory;
   sending, by the virtualization circuitry in response to trapping the first interrupt message, a second interrupt message to the processor from one of a plurality of virtual device controllers associated with the physical device controller, the second interrupt including a virtual address value in an address field of the second interrupt message and a virtual data value in a data field of the second interrupt message, the virtual address value associated with local interrupt controller according to one of the plurality of virtual machines' view of the system memory, the virtual data value corresponding to a second address of the interrupt handler according to one of the plurality of virtual machines' view of the system memory, the virtual address value and virtual data value from an entry in a programmable configuration storage, the entry including the physical address value and the physical data value to associate the physical device controller with a virtual device controller for the virtual machine, the programmable configuration storage having additional entries including the physical address value and the physical data value to associate the physical device controller with additional virtual device controllers for additional virtual machines.

5. The method of claim 4, further comprising programming the programmable configuration storage to maintain status of which of the plurality of virtual machines the first interrupt message is to be redirected.

6. The method of claim 4, wherein sending the second interrupt message to the processor is performed only after control of the processor has been transferred to the virtual machine.

* * * * *